United States Patent

Parker et al.

(10) Patent No.: US 8,063,129 B2
(45) Date of Patent: Nov. 22, 2011

(54) COMPOUNDS

(75) Inventors: David A Parker, Hessle (GB); Adam J Maltby, Leven (GB); Martin Read, Hull (GB); Philip J McCoy, Hull (GB)

(73) Assignee: Croda International PLC, Goole, North Humberside (GB)

( * ) Notice: Subject to any disclaimer, the term of this patent is extended or adjusted under 35 U.S.C. 154(b) by 895 days.

(21) Appl. No.: 11/885,377

(22) PCT Filed: Mar. 2, 2006

(86) PCT No.: PCT/GB2006/000749
§ 371 (c)(1), (2), (4) Date: Apr. 10, 2008

(87) PCT Pub. No.: WO2006/092605
PCT Pub. Date: Sep. 8, 2006

(65) Prior Publication Data
US 2009/0036583 A1    Feb. 5, 2009

(30) Foreign Application Priority Data

Mar. 2, 2005 (GB) .................. 0504468.0
Sep. 6, 2005 (GB) .................. 0518114.4

(51) Int. Cl.
*C08K 5/10* (2006.01)
*C08K 5/101* (2006.01)
*C08G 63/00* (2006.01)
*C07C 69/74* (2006.01)

(52) U.S. Cl. ........ 524/318; 524/322; 524/315; 528/308; 528/308.6; 560/1

(58) Field of Classification Search .................. 524/318, 524/322, 315; 528/308, 308.6; 560/1
See application file for complete search history.

(56) References Cited

U.S. PATENT DOCUMENTS

| 4,606,976 A * | 8/1986 | Hensel et al. ............ 428/480 |
| 4,639,484 A | 1/1987 | Percell et al. |
| 5,013,773 A * | 5/1991 | Nomura et al. .......... 523/222 |
| 5,741,586 A * | 4/1998 | Zierer et al. ............ 428/364 |
| 6,068,910 A * | 5/2000 | Flynn et al. ............ 428/141 |
| 6,326,435 B1 * | 12/2001 | Takayama et al. ........ 525/196 |
| 7,501,467 B2 * | 3/2009 | Parker et al. ............ 524/322 |
| 2007/0066731 A1 * | 3/2007 | Tattum et al. ............ 524/311 |

FOREIGN PATENT DOCUMENTS

| EP | 0 439 395 A | 7/1991 |
| GB | 2412375 A | 9/2005 |
| JP | 61066729 A | 4/1986 |
| JP | 04198259 A | 7/1992 |
| JP | 06 157879 A | 6/1994 |
| JP | 09 272191 A | 10/1997 |
| WO | WO 03/018731 A | 3/2003 |
| WO | WO 2005/085340 A | 9/2005 |

OTHER PUBLICATIONS

International Search Report for PCT/GB2006/000749 dated May 18, 2006.
Search Report for GB 0604216.2 dated Jun. 22, 2006.

* cited by examiner

*Primary Examiner* — Mark Eashoo
*Assistant Examiner* — Michael Pepitone
(74) *Attorney, Agent, or Firm* — Jones Day

(57) ABSTRACT

Use of a composition consisting essentially of a mixture of aliphatic esters as a slip agent in a polyester polymer, said composition comprising at least two esters selected from the group comprising: Myristyl myristate, Myristyl palmitate, palmityl myristate, palmityl palmitate, palmityl stearate, stearyl myristate, stearyl palmitate, stearyl stearate, stearyl arachidate and stearyl behenate.

25 Claims, 1 Drawing Sheet

COMPOUNDS

CROSS REFERENCE TO RELATED APPLICATION

This application is the National Phase application of International Application No. PCT/GB2006/000749, filed Mar. 2, 2006, which designates the United States and was published in English. This application, in its entirety, is incorporated herein by reference.

The present invention relates to polymer additives. It is particularly applicable to additives that reduce the coefficient of friction of a polyester polymer, such as PET, PETG, Polycarbonate or Polylactic acid.

Polyethylene terephthalate) (PET) is an important plastics material, widely used in the manufacture of moulded polyester articles and films. The key advantages of using PET are:

High clarity
Light weight
Good processability
Excellent barrier properties against oxygen and carbon dioxide
Good impact resistance
Tough—virtually unbreakable
Economic Largely as a consequence of the above properties, the most important plastic application for PET homopolymer and copolymers is in the manufacture of plastic bottles.

PET bottles are produced predominantly using a two stage stretch blow moulding process. Firstly a preform is produced by injection moulding. This is a relatively thick-walled part with the neck features moulded during this process. The preform is then reheated in a reheat blow machine that stretches the preform by a stretching pin and inflates it by blowing air into the mould to give the desired shape. This gives a biaxially orientated container that provides improved properties such as clarity and gas barrier performance. This is especially important for carbonated drink containers.

PET bottles may also be manufactured by injection blow moulding which is a 2-stage technique performed on a single machine. The preform is injection moulded and whilst still hot is moved to a blowing station where it is blown up to the desired shape. This is the preferred technique for small containers requiring specific neck detail or finish and produces containers that are less biaxially orientated.

A major difficulty in fabricating articles from PET is the relatively high coefficient of friction of the polymer. In the manufacture of bottles this problem can manifest itself in a number of ways:

Less than optimum packing density when preforms are packed into a box with concomitant higher storage and transportation costs.
Poor flow on conveying equipment and hence reduced throughput
Surface defects due to poor scratch resistance There is thus a need for an effective additive system for PET that reduces the coefficient of friction of the polymer and thus overcomes the above deficiencies.

Additives that are effective in reducing the coefficient of friction of polymers are known in the industry as slip additives. However, in order to be acceptable for beverage containers, the fabricated PET bottle must exhibit low colour and high clarity, with low taste and odour and be non-toxic. This imposes other important requirements on a slip agent in addition to its friction-reducing properties.

The conventional slip agents of choice in the plastics industry are fatty amides. These additives are widely used in polyolefins such as polyethylene, polypropylene, and related copolymers. Fatty amides employed as slip additives are generally manufactured from fatty acids containing between 16 and 22 carbon atoms and are characterised by a variety of structural forms:

Primary amides which can be either monounsaturated (as exemplified by erucamide and oleamide) or saturated (as exemplified by stearamide and behenamide)
Secondary amides as exemplified by stearyl erucamide and oleyl palmitamide
Bis amides such as ethylene bis stearamide In view of their widespread usage in polymer systems, it might appear logical to consider fatty amides as slip agents for polyesters such PET. However we have established that although fatty amides do demonstrate some friction reducing properties in PET, the lowering of the coefficient of friction is much less than in polyolefins. Moreover all amides cause discolouration in injection moulded PET which will severely restrict their utility in this polymer.

Those skilled in the art will be aware that separate and different classes of polymers have widely different chemical compositions and different molecular architectures. Thus, polyester polymers such as PET cannot be compared with polyvinyl chloride (PVC), polyamides such as nylon, or other classes of polymer. Not only do they behave differently as polymers, but different slip agents are required with different polymer classes. That is to say, one cannot extrapolate or predict how a particular compound, or mixture of compounds, will perform as slip agents in one polymer based on its performance as a slip agent in a different class of polymers.

Conventional slip agent technology cannot therefore be readily applied to PET. This is particularly the case in bottle manufacture where in addition to low coefficient of friction, other strict requirements with regard to colour, taste and odour must be met.

There are a number of references in the literature to the use of an aliphatic ester as an additive for various thermoplastic polyester resins. However, none of the esters described provide worthwhile or workable results when employed in the manufacture of bottles made from polyester polymers, particularly PET, when employed as a potential slip agent. For example, U.S. Pat. No. 6,326,435 (Polyplastics Co Ltd) describes the use of a variety of fatty acid esters in fabricating a shaped moulded article having improved sliding characteristics. However, there is no mention of using combinations of esters, and certainly none are exemplified, and the production of PET bottle performs is not referred to. Furthermore, the specific resins exemplified contain maleic anhydride modified polyethylene, making it entirely unsuitable for use in bottle manufacture.

JP09272191 (Kanebo Ltd) describes the incorporation of an aliphatic ester having 30-60 carbon atoms into the face layer only of a multilayered polyester sheet. This technology could not be applied to the manufacture of PET bottles and again there is no reference to mixtures of esters.

EP0947543 (Sumito Bakelite Company Limited) describes a sheet of polyester resin composition comprising 100 parts by weight of a copolyester resin obtained by replacing, in production of polyethylene terephthalate resin, 10 to 40 mole % of the ethylene glycol component with cyclohexanedimethanol, and 0.1 to 2 parts by weight of a fatty acid ester lubricant. Once again similar comments apply here as set out in relation to the references listed above.

Other references, such as GB2152061A refer to the use of stearyl stearate as an additive in the spinning of fibres. Once again, the technology is far removed from bottle manufacture and there is no reason even to suppose that the properties of such an additive would provide worthwhile results in the entirely different process of bottle manufacture.

It is therefore an object of the present invention to provide compositions having improved slip and anti-block characteristics when used in polymers such as PET and wherein other properties of the polymer are not adversely affected.

SUMMARY OF THE INVENTION

The present invention provides for the use of a composition as a slip agent in a polyester polymer, said composition consisting essentially of a mixture of esters in which each individual ester has a carbon chain length between 20 and 44.

Preferably said composition is formed by reacting one or more carboxylic acids each having a carbon chain length between 1 and 22 with one or more alcohols each having a carbon chain length between 1 and 22.

In an alternative embodiment said composition is formed by mixing together 2 or more esters, each individual ester having a carbon chain length between 20 and 44.

According to a first aspect of the present invention there is provided use of a composition as a slip agent in a polyester polymer, said composition comprising at least two esters of general Formula I

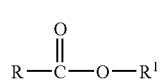

(I)

wherein: R and $R^1$ represent hydrocarbon moieties, each hydrocarbon moiety comprising 1 to 22 carbon atoms and wherein R and/or $R^1$ may be linear, branched chain, saturated or contain one or more double bonds;
and wherein the total number of carbon atoms in each individual ester in the mixture is between 20 and 44.

Using a mixture of aliphatic esters provides a composition that is highly effective at providing a rapid reduction of the coefficient of friction that is maintained during long-term storage of the moulded part.

Preferably the esters of general Formula I comprise at least 95% of the composition.

In a particularly preferred embodiment the esters according to general Formula I comprise at least 99% of the composition.

Preferably the esters of general Formula I are formed by reacting one or more carboxylic acids having a general Formula $RCO_2H$ (II) with one or more alcohols having a general Formula $R^1OH$ (III), such that the total number of carbon atoms in each individual ester in the mixture is between 20 and 44.

This means that commercially available mixtures of esters can be in conjunction with mixtures of alcohols.

In an alternative embodiment said composition is formed by mixing together two or more esters of general Formula I, each individual ester having a total number of carbon atoms between 20 and 44. This latter method allows for a more predictable combination of esters.

Preferably the total number of carbon atoms in each individual ester in the mixture is between 28 and 34.

According to a preferred embodiment of the present invention there is provided use of a composition consisting essentially of a mixture of aliphatic esters as a slip agent in a polyester polymer, said composition comprising at least two esters selected from the group comprising:—
myrisityl myristate
Myristyl palmitate
palmityl myristate
palmityl palmitate
palmityl stearate
stearyl myristate
stearyl palmitate
stearyl stearate
stearyl arachidate and
stearyl behenate.

Preferably said composition comprises at least three esters selected from said group.

Preferably each ester component is present in an amount of 0.5% to 95%, more preferably 5% to 90% and more preferably 10% to 90% by weight of the composition.

Preferably said group of esters comprises:—
myristyl myristate
myristyl palmitate
palmityl myristate
palmityl palmitate
stearyl myristate and
stearyl palmitate.

Preferably said composition comprises <1% to 17% Myristyl myristate, 0.5% to 38% Myristyl palmitate, 4% to 34% palmityl myristate, 10% to 45% palmityl palmitate, 2% to 14% stearyl myristate, 4% to 53% stearyl palmitate, <1% to 4% palmityl stearate, <1% to 45% stearyl stearate, <1% to 3% stearyl arachidate, and <1% to 45% stearyl behenate, by weight.

Preferably the composition comprises 14 to 17% myristyl myristate, 32 to 38% myristyl palmitate, 8 to 12% palmityl myristate, 20 to 24% palmityl palmitate, 4 to 6% stearyl myristate and 8 to 12% stearyl palmitate, by weight.

Preferably the composition comprises 13 to 16% myristyl myristate, 8 to 10% myristyl palmitate, 30 to 34% palmityl myristate, 18 to 22% palmityl palmitate, 12 to 14% stearyl myristate and 7 to 10% stearyl palmitate, by weight.

Preferably the composition comprises 0.5 to 1.5% myristyl palmitate, 18 to 22% palmityl myristate, 41 to 45% palmityl palmitate, 9 to 11% stearyl myristate and 20 to 24% stearyl palmitate, by weight.

Preferably the composition comprises 7 to 9% myristyl myristate, 16 to 19% myristyl palmitate, 4 to 6% palmityl myristate, 10 to 1270 palmityl palmitate, 2 to 4% stearyl myristate and 5 to 7% stearyl palmitate and 40 to 45% stearyl stearate, by weight.

Preferably the composition comprises 7 to 9% myristyl myristate, 16 to 19% myristyl palmitate, 4 to 6% palmityl myristate, 10 to 12% palmityl palmitate, 2 to 4% stearyl myristate, 4 to 6% stearyl palmitate, <1 to 2% stearyl stearate, 1 to 3% stearyl arachidate and 40 to 45% stearyl behenate.

Preferably the composition comprises 7 to 9% myristyl myristate, 16 to 19% myristyl palmitate, 4 to 6% palmityl myristate, 10 to 12% palmityl palmitate, 2 to 4% stearyl myristate and 48 to 53% stearyl palmitate, by weight.

Due to the variability of the chemical reactions used to produce such ester mixtures, some variability in exact proportional amounts can be expected. The percentage figures quoted could therefore vary by ±1% due to such variability.

Preferably the polyester polymer is selected from the group comprising:—
poly(butylene terephthalate)
poly(cyclohexanedimethylene terephthalate)
poly(ethylene isophthalate)
poly(ethylene 2,6-naphthalenedicarboxylate).

poly(ethylene phthalate)
poly(ethylene terephthalate)
PETG (glycolised polyester)
polycarbonates
polylactic acid (PLA)
and co-polymers thereof.

In a particularly preferred embodiment the polyester polymer comprises poly(ethylene terephthalate). This polymer is particularly preferred for making bottles.

Preferably said composition is present in said polyester polymer in an amount of between 0.1% to 1.0% wt/wt, more preferably in an amount of between 0.1% to 0.75% wt/Wt and preferably said polyester polymer in an amount in the order of 0.2% wt/wt. The exact concentration will be determined by the materials expert after suitable experimentation.

According to a further aspect of the present invention there is provided a composition for use as a slip agent in a polyester polymer, said composition comprising at least two esters of general Formula I

(I)

wherein: R and $R^1$ represent hydrocarbon moieties, each hydrocarbon moiety comprising 1 to 22 carbon atoms and wherein R and/or $R^1$ may be linear, branched chain, saturated or contain one or more double bonds;
and wherein the total number of carbon atoms in each individual ester in the mixture is between 20 and 44.

Preferably the esters of general Formula I are formed by reacting one or more carboxylic acids having a general Formula $RCO_2H$ (II) with one or more alcohols having a general. Formula $R^{10}H$ (III), such that the total number of carbon atoms in each individual ester in the mixture is between 20 and 44.

Preferably said composition is formed by mixing together two or more esters of general Formula I, each individual ester having a total number of carbon atoms between 20 and 44.

Preferably the total number of carbon atoms in each individual ester in the mixture is between 28 and 34.

Preferably said composition consisting essentially of a mixture of aliphatic esters as a slip agent in a polyester polymer, said composition comprising at least two esters selected from the group comprising:—
Myristyl myristate
Myristyl palmitate
palmityl myristate
palmityl palmitate
palmityl stearate
stearyl myristate
stearyl palmitate
stearyl stearate
stearyl arachidate and
stearyl behenate.

Preferably said composition comprises at least three esters selected from said group.

Preferably each ester component is present in an amount of 0.5% to 95%, more preferably 5% to 90% and more preferably 10% to 90% by weight of the composition.

Preferably said group comprises:—
myristyl myristate
myristyl palmitate
palmityl myristate
palmityl palmitate
stearyl myristate and
stearyl palmitate.

Preferably said composition comprising <1% to 17% Myristyl myristate, 0.5% to 38% Myristyl palmitate, 4% to 34% palmityl myristate, 10% to 14% palmityl palmitate, 2% to 14% stearyl myristate, 4% to 53% stearyl palmitate, <1% to 4% palmityl stearate, <1% to 45% stearyl stearate, <1% to 3% stearyl arachidate, and <1% to 45% stearyl behenate, by weight.

Preferably the composition comprises 14 to 17% myristyl myristate, 32 to 38% myristyl palmitate, 8 to 12% palmityl myristate, 20 to 24% palmityl palmitate, 4 to 6% stearyl myristate and 8 to 12% stearyl palmitate, by weight.

Preferably the composition comprises 13 to 16% myristyl myristate, 8 to 10% myristyl palmitate, 30 to 34% palmityl myristate, 18 to 22% palmityl palmitate, 12 to 14% stearyl myristate and 7 to 10% stearyl palmitate, by weight.

Preferably the composition comprises 0.5 to 1.5% myristyl palmitate, 18 to 22% palmityl myristate, 41 to 45% palmityl palmitate, 9 to 11% stearyl myristate and 20 to 24% stearyl palmitate, by weight.

Preferably the composition comprises 7 to 9% myristyl myristate, 16 to 19% myristyl palmitate, 4 to 6% palmityl myristate, 10 to 12% palmityl palmitate, 2 to 4% stearyl myristate and 5 to 7% stearyl palmitate and 40 to 45% stearyl stearate, by weight.

Preferably the composition comprises 7 to 9% myristyl myristate, 16 to 19% myristyl palmitate, 4 to 6% palmityl myristate, 10 to 12% palmityl palmitate, 2 to 4% stearyl myristate, 4 to 6% stearyl palmitate, 0 to 2% stearyl stearate, 1 to 3% stearyl arachidate and 40 to 45% stearyl behenate.

Preferably the composition comprises 7 to 9% myristyl myristate, 16 to 19% myristyl palmitate, 4 to 6% palmityl myristate, 10 to 12% palmityl palmitate, 2 to 4% stearyl myristate and 48 to 53% stearyl palmitate, by weight.

Preferably the polyester polymer is selected from the group comprising:—
poly(butylene terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
PETG (glycolised polyester)
polycarbonates
polylactic acid (PLA)
and co-polymers thereof.

Preferably said composition is present in said polyester polymer in an amount of between 0.1% to 1.0% wt/wt.

More preferably said composition is present in said polyester polymer in an amount of between 0.2% to 0.75% wt/wt.

According to a further aspect of the present invention there is provided a polyester polymer incorporating a composition according to the present invention and as defined herein.

Preferably the polyester polymer is selected from the group comprising:—
poly(cyclohexanedimethylene terephthalate)
poly(ethylene isophthalate)
poly(ethylene 2,6-naphthalenedicarboxylate)
poly(ethylene phthalate)
poly(ethylene terephthalate)
PETG (glycolised polyester)
polycarbonates
polylactic acid (PLA)
and co-polymers thereof.

The present invention therefore relates to the discovery of a novel range of slip additives for polyester polymers such as PET that are highly effective in lowering the coefficient of friction of the fabricated article whilst maintaining low colour and high clarity. More particularly, additives conforming to this invention afford a rapid reduction in the coefficient of friction that is maintained during long-term storage of the moulded part. This is particularly critical in the production of preforms and bottles from PET.

DETAILED DESCRIPTION

Figure 1:
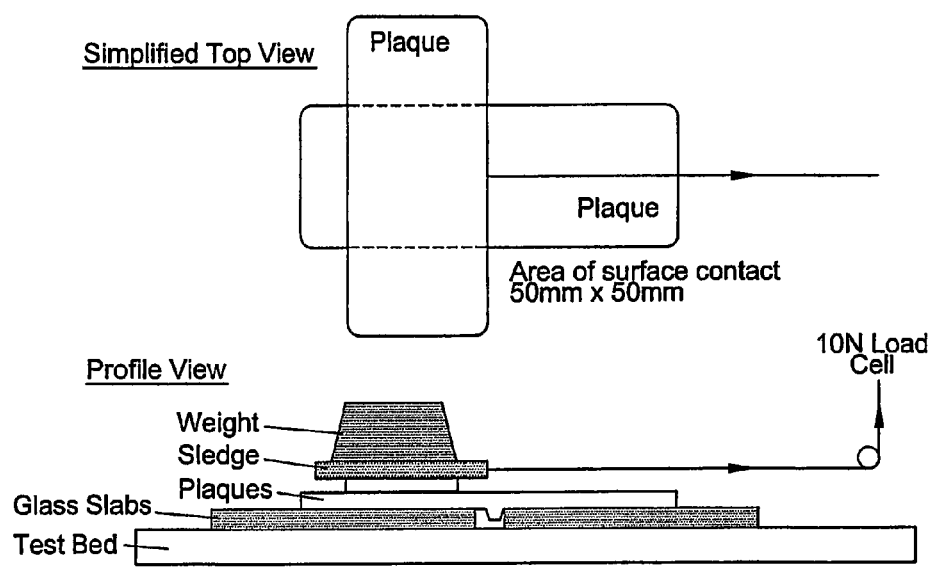
FIG. 1 is the schematic top view and profile view of the test apparatus used to measure the coefficient of friction (static and kinetic).

The term "PET" as used herein in describing this invention has a broad meaning. It includes all polymeric and copolymeric forms of poly (ethylene terephthalate). The compounds of this invention are also effective slip agents for other polyester polymers and copolymers as exemplified by polybutylene terephthalate and poly (ethylene naphthalate). Thus the term PET should be considered, in this context, to be a generic term to include all polymers derived from aromatic diacids including all terephthalate polymers and their derivatives, both known and those yet to be discovered.

The term polyester also has a broad meaning in this context. It includes polymers containing a number of ester linkages in the main chain. This includes, but is not limited to, polymers produced by reacting dibasic acids with dihydric alcohols, by reacting polyhydroxyl compounds with a carbonic acid derivative (polycarbonates) and polymers derived by ring opening polymerization of lactide too polylactide.

It has unexpectedly been discovered that mixtures of aliphatic esters show significant advantages over single esters in reducing the coefficient of friction of moulded polyester polymer articles. The additive compositions of the present invention comprise at least two esters of general Formula I

(I)

wherein: R and $R^1$ represent hydrocarbon moieties, each hydrocarbon moiety comprising 1 to 22 carbon atoms and wherein R and/or $R^1$ may be linear, branched chain, saturated or contain one or more double bonds;
and wherein the total number of carbon atoms in each individual ester in the mixture is between 20 and 44.

Typical formulations of mixed aliphatic esters are shown in Table 2 below. Of these formulations, Formulation 1 is preferred. The composition of Formulation I is set out in more detail in Table 3 below:—

TABLE 3

Composition of Formulation I

| Ester | Carbon chain lengths | % wt |
|---|---|---|
| Myristyl myristate | (C14:C14) | 13.3 |
| Cetyl myristate | (C16:C14) | 33.6 |
| Stearyl myristate | (C18:C14) | 13.9 |
| Myristyl palmitate | (C14:C16) | 8.0 |

TABLE 3-continued

Composition of Formulation I

| Ester | Carbon chain lengths | % wt |
|---|---|---|
| Cetyl palmitate | (C16:C16) | 20.3 |
| Stearyl palmitate | (C18:C16) | 8.4 |
|  |  | 97.5 |

The other minor components (mostly mixed esters of C12-C20 fatty acids and C12-C20 fatty alcohols) will be present at <1%.

For optimum results, esters having between 20 and 44 carbon atoms in each individual ester molecule make up at least 95% of the slip agent composition. Preferably these esters make up in the order of 99% of the composition. Such mixed ester compositions may be prepared by reacting a mixture of carboxylic acids with a mixture of aliphatic alcohols of the appropriate chain lengths under esterification conditions such that the individual esters of the product contain between 20 and 44 carbon atoms each. Alternatively, individual esters can be prepared having between 20 and 44 carbon atoms each and a number of individual esters mixed together in the desired amounts. Mixing of these esters can be achieved by weighing and intimately mixing individual esters in the appropriate wt/wt amounts in either a powder blend or a melt blend.

To achieve the required level of slip performance in PET, the additives of this invention are incorporated at levels of between 0.1% and 1% and preferably between 0.2% and 0.75% wt/wt.

The slip additives of this invention may be incorporated into the polymer by a number of processes well known to those skilled in the art. For example they may be added directly to the resin by melt dosing at the point of extrusion, by conventional master batch addition or by incorporation using liquid colour systems.

For the avoidance of doubt, it will be appreciated that it is common practice in polymer chemistry to add a variety of additives to polymers during processing. Thus, aliphatic esters according to the present invention may not be the only additives present. It follows therefore that, to fall within the claimed scope of the present invention, two or more aliphatic esters is defined above and in the appended claims may be present in a combined amount between 0.1% and 1.0% by wt of the total polymer composition.

Slip additives according to the present invention can be incorporated into polymers and polymer blends using conventional techniques. These include coating pellets of the polymer with the additive prior to moulding; pumping premelted additive into the moulding machine; mixing the additive with the PET or compatible polymer to form a concentrate containing say 10% of the additive mixture and mixing this with pellets of PET prior to moulding. The additive mixture may also be dispersed into a liquid carrier system that in turn is used to coat the polymer pellets. In any event, the most suitable dosing method will be selected by the materials specialist to suit a particular application.

EXAMPLES

To demonstrate the effectiveness of the aforementioned additives in reducing the friction of PET surfaces the following procedure was adopted.

A PET co-polymer (IV 0.8) suitable for the manufacture of bottles and other food packaging containers by injection moulding, blow moulding or a combination of both was used. The PET was dried for 8 hours at 145° C. and the additive coated directly onto the surface of the polymer by tumble mixing whilst the polymer was still hot.

The PET was then moulded into 100×50×2 mm plaques on a 35 tonne lock injection-moulding machine using the following conditions:

| | |
|---|---|
| Temperature: | All zones at 270° C. |
| Injection Pressure: | 85 Bar |
| Shot size: | 29.0 mm |
| Pack: | 20 Bar; 3 secs |
| Hold: | 75 Bar; 3 secs |
| Cooling: | 20 secs |
| Tool Temp: | 10° C. |

The Coefficient of Friction (static and kinetic) of the resulting plaques were then measured on a Lloyd LRX tensile tester and a 10N load cell at the following time intervals after moulding—1 hour, 24 hours, 1 week and 2 weeks. The friction method was adapted from ASTM 1894. The sledge weight including the plaque was 1000 g and the area of surface contact between the two plaques was 50 mm×50 mm (see diagram). The test was run over a distance of 60 mm at 150 mm/min. Each test was conducted 5 times for each time interval using new plaques on each run. A diagram of the test apparatus is shown in FIG. 1.

Due to the nature of PET the friction can vary from day to day depending on process and ambient conditions and its hygroscopic nature. The coefficient of friction recorded for PET with no additives was generally between 0.5 and 1.2. To enable comparisons to be made from experiments carried out on different days blank runs were carried out before and after each series of PET+additives on each day. The results are reported as a percentage of the blank as it was observed that a given additive would give a proportionally lower, result on a day where a low friction was recorded for the blank.

A number of additives of mixed ester composition were tested against single esters and single amides for comparison the results being displayed in Table 1 and representative compositions are given in Table 2 labelled Formulations 1-6.

A summary of the slip additives tested is given below:

TABLE 1

| | | Coefficient of Friction (% of blank) | | | | | |
|---|---|---|---|---|---|---|---|
| | | Static | | | Dynamic | | |
| Sample | Conc % | initial | 1 day | 7 days | initial | 1 day | 7 days |
| erucamide | 0.5 | 85 | NR | 76 | 78 | NR | 73 |
| behenamide | 0.5 | 62 | NR | 100 | 71 | NR | 96 |
| GMS 90 | 0.5 | 0 | NR | 109 | 0 | NR | 106 |
| GMB | 0.5 | 0 | NR | 124 | 0 | NR | 106 |
| PEG200 dierucate | 0.5 | 89 | NR | 140 | 72 | NR | 120 |
| PEG200 dioleate | 0.5 | NR | fail | NR | NR | fail | NR |
| Pentaerythritol dioleate | 0.5 | NR | fail | fail | NR | fail | fail |
| Pentaerythritol monooleate | 0.5 | NR | fail | fail | NR | fail | fail |
| PEG400 monolaurate | 0.5 | NR | fail | fail | NR | fail | fail |
| sorbitan monostearate | 0.5 | NR | fail | fail | NR | fail | fail |
| Calcium stearate | 0.5 | NR | NR | 124 | NR | NR | 107 |
| pentaerythritol tetrastearate | 0.5 | 95 | NR | 86 | 107 | NR | 73 |
| butyl stearate | 0.5 | 86 | NR | 87 | 70 | NR | 71 |
| EthylHexyl stearate | 0.5 | 80 | NR | 83 | 62 | NR | 63 |
| lauryl palmitate | 0.5 | 74 | NR | 85 | 63 | NR | 61 |
| oleyl behenate | 0.5 | 122 | NR | 173 | 80 | NR | 114 |
| behenyl behenate | 0.5 | 98 | NR | 94 | 118 | NR | 79 |
| lauryl behenate | 0.5 | 55 | NR | 55 | 62 | NR | 47 |
| lauryl behenate | 0.2 | 60 | NR | 72 | 57 | NR | 59 |
| oleyl erucate | 0.5 | 123 | NR | fail | 114 | fail | fail |
| EGDS | 0.5 | 92 | 90 | 68 | 86 | 95 | 77 |
| cetostearyl phthalate | 0.5 | 45 | 83 | 82 | 54 | 95 | 74 |
| butyl behenate | 0.05 | 49 | 83 | 34 | 57 | 64 | 68 |
| butyl behenate | 0.1 | 33 | 65 | 33 | 52 | 62 | 70 |
| butyl behenate | 0.2 | 18 | 38 | 24 | 42 | 55 | 62 |
| butyl behenate | 0.5 | 15 | 30 | 16 | 27 | 33 | 43 |
| ester Formulation 1 | 0.1 | 64 | 50 | 58 | 91 | 59 | 99 |
| ester Formulation 1 | 0.2 | 38 | 38 | 36 | 45 | 38 | 28 |
| ester Formulation 1 | 0.3 | 29 | 34 | 30 | 32 | 30 | 25 |
| ester Formulation 2 | 0.2 | 69 | 51 | | 80 | 62 | |
| ester Formulation 3 | 0.2 | 67 | 54 | | 64 | 44 | |
| stearyl stearate | 0.1 | 100 | 92 | 77 | 131 | 92 | 102 |
| stearyl stearate | 0.2 | 34 | 41 | 37 | 41 | 39 | 43 |
| stearyl stearate | 0.3 | 33 | 40 | 33 | 32 | 36 | 28 |
| stearyl behenate | 0.1 | 60 | 70 | 58 | 135 | 122 | 159 |
| stearyl behenate | 0.2 | 33 | 41 | 91 | 43 | 44 | 63 |
| stearyl behenate | 0.3 | 42 | 49 | 53 | 57 | 48 | 41 |
| stearyl palmitate | 0.1 | 175 | 109 | 312 | 270 | 162 | 244 |
| stearyl palmitate | 0.2 | 62 | 49 | 89 | 69 | 54 | 83 |
| stearyl palmitate | 0.3 | 33 | 39 | 30 | 43 | 36 | 41 |
| ester Formulation 4 | 0.2 | 48 | 46 | 48 | 56 | 48 | 47 |

TABLE 1-continued

| | | Coefficient of Friction (% of blank) | | | | | |
| | | Static | | | Dynamic | | |
| Sample | Conc % | initial | 1 day | 7 days | initial | 1 day | 7 days |
|---|---|---|---|---|---|---|---|
| ester Formulation 5 | 0.2 | 68 | 57 | 74 | 72 | 55 | 63 |
| ester Formulation 6 | 0.2 | 58 | 46 | 72 | 85 | 63 | 104 |
| Ethyl behenate | 0.2 | 42 | 49 | 59 | 33 | 42 | 49 |
| Behenyl acetate | 0.2 | 34 | 42 | 54 | 31 | 34 | 44 |
| Dilauryl succinate | 0.2 | 74 | 69 | | 68 | 59 | |

TABLE 2

| | | alcohol | | | | |
| | | lauryl | myristyl | palmityl | stearyl | arachidyl |
|---|---|---|---|---|---|---|
| Formulation 1 | | | | | | |
| acid | laurate | <1 | <1 | <1 | <1 | <1 |
| | myristate | <1 | 14-17 | 8-12 | 4-6 | <1 |
| | palmitate | <1 | 32-38 | 20-24 | 8-12 | <1 |
| | stearate | <1 | <1 | <1 | <1 | <1 |
| Formulation 2 | | | | | | |
| acid | laurate | <1 | <1 | <1 | <1 | <1 |
| | myristate | <1 | 13-16 | 30-34 | 12-14 | <1 |
| | palmitate | <1 | 8-10 | 18-22 | 7-10 | <1 |
| | stearate | <1 | <1 | <1 | <1 | <1 |
| Formulation 3 | | | | | | |
| acid | laurate | <1 | <1 | <1 | <1 | <1 |
| | myristate | <1 | <1 | 18-22 | 9-11 | <1 |
| | palmitate | <1 | 0.5-1.5 | 41-45 | 20-24 | <1 |
| | stearate | <1 | <1 | <1 | <1 | <1 |
| Formulation 4 | | | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 5-7 | <1 |
| | stearate | <1 | <1 | 2-4 | 40-45 | <1 |
| Formulation 5 | | | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 4-6 | <1 |
| | stearate | <1 | <1 | <1 | <2 | <1 |
| | arachidate | <1 | <1 | <1 | 1-3 | <1 |
| | behenate | <1 | <1 | <1 | 40-45 | <1 |
| Formulation 6 | | | | | | |
| acid | laurate | <1 | <1 | <1 | <1 | <1 |
| | myristate | <1 | 7-9 | 4-6 | 2-4 | <1 |
| | palmitate | <1 | 16-19 | 10-12 | 48-53 | <1 |
| | stearate | <1 | <1 | <1 | <1 | <1 |

The superior performance of the additives of this invention, particularly Formulations 1 and 2, can be readily appreciated by reference to the above results. To simplify matters, selected results have been extracted from Table 2 and reproduced in Table 4. These results illustrate the unexpectedly low coefficient of friction (CoF) produced by incorporating just 0.2% by weight of Formulation I into PET.

TABLE 4

Activity of Formulation I compared to individual aliphatic esters

| | Concentration (%) | CoF 1 day (% of blank) | CoF 7 days (% of blank) | CoF 14 days (% of blank) |
|---|---|---|---|---|
| Formulation 1 | 0.2 | 38 | 28 | 29 |
| Stearyl Stearate | 0.2 | 39 | 43 | 39 |
| Stearyl behenate | 0.2 | 44 | 63 | 45 |
| Butyl behenate | 0.2 | 42 | 55 | 62 |
| Stearyl palmitate | 0.2 | 54 | 83 | 57 |
| Lauryl palmitate | 0.5 | Not recorded | 61 | 75 |

The data in Table 4 shows the advantage of mixed ester compositions over and above single esters in reducing the coefficient of friction of moulded PET articles. Without wishing to be constrained to any particular theory, it is hypothesised that ester mixtures according to the present invention have a different crystal morphology to that of individual single esters, allowing items made from PET incorporating ester mixtures to slide more easily over each other. Clearly the improvement is not just based on the fact that the mixture contains lower molecular weight esters than stearyl stearate as butyl behenate and lauryl palmitate give poorer results in terms of lowering the coefficient of friction.

Conventional amide slip agents, as exemplified by erucamide and behenamide, lowered the coefficient of friction to between 62% and 85% of the blank but resulted in severe yellowing of the polymer. In addition, in the case of behenamide, the effect was short lived and after 7 days was back to the control value.

Additives conforming to this invention afforded a significantly greater reduction in the coefficient of friction when compared with conventional amide slip agents but the polymer plaques remained clear and transparent. In addition, mixtures of esters afford significantly greater reduction in the coefficient of friction when compared to individual esters that are present in that mixture. Formulations 1 and 4 have proved particularly effective in this regard and encouragingly the results in these laboratory tests have proved to be in line with results shown in pilot plant studies on bottle manufacture.

It appears to be important for very low coefficients of friction and for a long-lived duration of action, which is most important in bottle manufacture for the reasons described above, to have a mixture of esters including those esters formed from C14 to C18 acids and C14 to C18 alcohols. Such mixtures are exemplified, for example, by Formulation 1, Formulation 2 and Formulation 4.

It is of note that some esters of polyethylene glycol (not conforming to this invention) as exemplified by PEG 200 dierucate afforded an initial reduction in the coefficient of friction but this effect diminished over the 7-day test period. This renders compounds of this nature of little value as long-term slip agents for PET.

It is envisaged that mixtures of slip agents of general Formulations 1 to 6 shown in Table 2 can be used in polymers and co-polymers and that such agents may also be used in combination with known slip agents.

Slip additives according to the present invention find application in a wide variety of polyester polymers. Such polyesters include, but are no way limited to:— poly(butylene terephthalate)
poly(cyclohexanedimethylene terephthalate)
poly(ethylene isophthalate)
poly(ethylene 2,6-naphthalenedicarboxylate)
poly(ethylene phthalate)
poly(ethylene terephthalate)
PETG (glycolised polyester) polycarbonates
polylactic acid (PLA)
and co-polymers thereof.

Experimental results showing the anti-slip properties of Formulation 2 from Table 2 when incorporated in Polylactic acid, Polycarbonate and PETG are shown in Tables 5, 6 and 7.

TABLE 5

| | Polylactic acid | | | | | |
|---|---|---|---|---|---|---|
| | Static | | | Kinetic | | |
| Formulation | Initial Static | 1 day Static | 2 weeks Static | Initial Kinetic | 1 day Kinetic | 2 weeks Kinetic |
| Blank Polylactic Acid | 100.0 | 100.0 | 100.0 | 100.0 | 100.0 | 100.0 |
| Formulation 2 (0.5%) | 60.1 | 51.2 | 51.6 | 61.1 | 54.4 | 57.7 |

TABLE 6

| | Polycarbonate | | | | | |
|---|---|---|---|---|---|---|
| | Static | | | Kinetic | | |
| Formulation | Initial Static | 1 day Static | 2 weeks Static | Initial Kinetic | 1 day Kinetic | 2 weeks Kinetic |
| Blank Polycarbonate | 100.0 | 100.0 | 100.0 | 100.0 | 100.0 | 100.0 |
| Formulation 2 (0.1%) | 25.4 | 71.1 | 64.3 | 41.0 | 85.4 | 54.9 |
| Formulation 2 (0.25%) | 36.3 | 39.7 | 45.5 | 49.4 | 56.6 | 38.9 |
| Formulation 2 (0.50%) | 25.7 | 38.0 | 29.0 | 34.3 | 40.7 | 30.0 |

TABLE 7

| | PETG | | | | | | | |
|---|---|---|---|---|---|---|---|---|
| Formulation | Static Initial Static | 24 hrs Static | 1 week Static | 2 weeks Static | Kinetic Initial Kinetic | 24 hrs Kinetic | 1 week Kinetic | 2 weeks Kinetic |
| Blank PETG | 100.0 | 100.0 | 100.0 | 100.0 | 100.0 | 100.0 | 100.0 | 100.0 |
| Formulation 2 (0.05%) | 84.7 | 82.2 | 85.0 | 79.8 | 79.4 | 85.0 | 81.3 | 85.5 |
| Formulation 2 (0.10%) | 72.2 | 68.6 | 76.3 | 62.8 | 67.8 | 69.5 | 69.6 | 63.5 |
| Formulation 2 (0.25%) | 51.8 | 48.5 | 58.5 | 53.0 | 37.8 | 39.4 | 48.3 | 48.3 |
| Formulation 2 (0.50%) | 44.4 | 42.0 | 47.5 | 41.4 | 29.9 | 32.8 | 35.2 | 37.4 |

It has unexpectedly been found that mixtures two, or more preferably three of the fatty acid esters selected from the group comprising:— myristyl myristate myristyl palmitate palmityl myristate palmityl palmitate stearyl myristate and stearyl palmitate perform unexpectedly well as slip agents when added to polyester polymers as described above. Each ester component in the slip agent composition is preferably present in an amount of 10% to 90% of the composition by weight, more preferably 25% to 65% of the composition by weight, and more preferably 30% to 60% by weight. Examples of such compositions are given in Table 8 below.

TABLE 8

| | | alcohol | | | | |
|---|---|---|---|---|---|---|
| | | lauryl | myristyl | palmityl | stearyl | arachidyl |
| Formulation 7 | | | | | | |
| acid | laurate | <1 | <1 | <1 | <1 | <1 |
| | myristate | <1 | 10-90 | <1 | <1 | <1 |
| | palmitate | <1 | <1 | <1 | <1 | <1 |
| | stearate | <1 | <1 | <1 | 10-90 | <1 |
| Formulation 8 | | | | | | |
| acid | laurate | <1 | <1 | <1 | <1 | <1 |
| | myristate | <1 | <1 | <1 | <1 | <1 |
| | palmitate | <1 | 10-90 | <1 | <1 | <1 |
| | stearate | <1 | <1 | <1 | 10-90 | <1 |
| Formulation 9 | | | | | | |
| acid | laurate | <1 | <1 | <1 | <1 | <1 |
| | myristate | <1 | <1 | 10-90 | <1 | <1 |
| | palmitate | <1 | <1 | <1 | <1 | <1 |
| | stearate | <1 | <1 | <1 | 10-90 | <1 |
| Formulation 10 | | | | | | |
| acid | laurate | <1 | <1 | <1 | <1 | <1 |
| | myristate | <1 | <1 | <1 | <1 | <1 |
| | palmitate | <1 | <1 | 10-90 | <1 | <1 |
| | stearate | <1 | <1 | <1 | 10-90 | <1 |
| Formulation 11 | | | | | | |
| acid | laurate | <1 | <1 | <1 | <1 | <1 |
| | myristate | <1 | <1 | <1 | 10-90 | <1 |
| | palmitate | <1 | <1 | <1 | <1 | <1 |
| | stearate | <1 | <1 | <1 | 10-90 | <1 |
| Formulation 12 | | | | | | |
| acid | laurate | <1 | <1 | <1 | <1 | <1 |
| | myristate | <1 | <1 | <1 | <1 | <1 |
| | palmitate | <1 | <1 | <1 | 10-90 | <1 |
| | stearate | <1 | <1 | <1 | 10-90 | <1 |
| Formulation 13 | | | | | | |
| acid | laurate | <1 | <1 | <1 | <1 | <1 |
| | myristate | <1 | 10-90 | <1 | <1 | <1 |
| | palmitate | <1 | 10-90 | <1 | <1 | <1 |
| | stearate | <1 | <1 | <1 | <1 | <1 |
| Formulation 14 | | | | | | |
| acid | laurate | <1 | <1 | <1 | <1 | <1 |
| | myristate | <1 | 10-90 | 10-90 | <1 | <1 |
| | palmitate | <1 | <1 | <1 | <1 | <1 |
| | stearate | <1 | <1 | <1 | <1 | <1 |
| Formulation 15 | | | | | | |
| acid | laurate | <1 | <1 | <1 | <1 | <1 |
| | myristate | <1 | 10-90 | <1 | <1 | <1 |

TABLE 8-continued

| | | alcohol | | | | |
|---|---|---|---|---|---|---|
| | | lauryl | myristyl | palmityl | stearyl | arachidyl |
| | palmitate | <1 | <1 | 10-90 | <1 | <1 |
| | stearate | <1 | <1 | <1 | <1 | <1 |
| Formulation 16 | | | | | | |
| acid | laurate | <1 | <1 | <1 | <1 | <1 |
| | myristate | <1 | 10-90 | <1 | 10-90 | <1 |
| | palmitate | <1 | <1 | <1 | <1 | <1 |
| | stearate | <1 | <1 | <1 | <1 | <1 |
| Formulation 17 | | | | | | |
| acid | laurate | <1 | <1 | <1 | <1 | <1 |
| | myristate | <1 | 10-90 | <1 | <1 | <1 |
| | palmitate | <1 | <1 | <1 | 10-90 | <1 |
| | stearate | <1 | <1 | <1 | <1 | <1 |
| Formulation 18 | | | | | | |
| acid | laurate | <1 | <1 | <1 | <1 | <1 |
| | myristate | <1 | <1 | 10-90 | <1 | <1 |
| | palmitate | <1 | 10-90 | <1 | <1 | <1 |
| | stearate | <1 | <1 | <1 | <1 | <1 |
| Formulation 19 | | | | | | |
| acid | laurate | <1 | <1 | <1 | <1 | <1 |
| | myristate | <1 | <1 | <1 | <1 | <1 |
| | palmitate | <1 | 10-90 | 10-90 | <1 | <1 |
| | stearate | <1 | <1 | <1 | <1 | <1 |
| Formulation 20 | | | | | | |
| acid | laurate | <1 | <1 | <1 | <1 | <1 |
| | myristate | <1 | <1 | <1 | 10-90 | <1 |
| | palmitate | <1 | 10-90 | <1 | <1 | <1 |
| | stearate | <1 | <1 | <1 | <1 | <1 |
| Formulation 21 | | | | | | |
| acid | laurate | <1 | <1 | <1 | <1 | <1 |
| | myristate | <1 | <1 | <1 | <1 | <1 |
| | palmitate | <1 | 10-90 | <1 | 10-90 | <1 |
| | stearate | <1 | <1 | <1 | <1 | <1 |
| Formulation 22 | | | | | | |
| acid | laurate | <1 | <1 | <1 | <1 | <1 |
| | myristate | <1 | <1 | 10-90 | <1 | <1 |
| | palmitate | <1 | <1 | 10-90 | <1 | <1 |
| | stearate | <1 | <1 | <1 | <1 | <1 |
| Formulation 23 | | | | | | |
| acid | laurate | <1 | <1 | <1 | <1 | <1 |
| | myristate | <1 | <1 | 10-90 | 10-90 | <1 |
| | palmitate | <1 | <1 | <1 | <1 | <1 |
| | stearate | <1 | <1 | <1 | <1 | <1 |
| Formulation 24 | | | | | | |
| acid | laurate | <1 | <1 | <1 | <1 | <1 |
| | myristate | <1 | <1 | 10-90 | <1 | <1 |
| | palmitate | <1 | <1 | <1 | 10-90 | <1 |
| | stearate | <1 | <1 | <1 | <1 | <1 |
| Formulation 25 | | | | | | |
| acid | laurate | <1 | <1 | <1 | <1 | <1 |
| | myristate | <1 | <1 | <1 | 10-90 | <1 |
| | palmitate | <1 | <1 | 10-90 | <1 | <1 |
| | stearate | <1 | <1 | <1 | <1 | <1 |
| Formulation 26 | | | | | | |
| acid | laurate | <1 | <1 | <1 | <1 | <1 |
| | myristate | <1 | <1 | <1 | <1 | <1 |
| | palmitate | <1 | <1 | 10-90 | 10-90 | <1 |
| | stearate | <1 | <1 | <1 | <1 | <1 |
| Formulation 27 | | | | | | |
| acid | laurate | <1 | <1 | <1 | <1 | <1 |
| | myristate | <1 | <1 | <1 | 10-90 | <1 |

TABLE 8-continued

| | | alcohol | | | | |
|---|---|---|---|---|---|---|
| | | lauryl | myristyl | palmityl | stearyl | arachidyl |
| | palmitate | <1 | <1 | <1 | 10-90 | <1 |
| | stearate | <1 | <1 | <1 | <1 | <1 |
| | | Formulation 28 | | | | |
| acid | laurate | <1 | <1 | <1 | <1 | <1 |
| | myristate | <1 | <1 | <1 | 10-90 | <1 |
| | palmitate | <1 | <1 | <1 | 10-90 | <1 |
| | stearate | <1 | <1 | <1 | <1 | <1 |
| | | Formulation 29 | | | | |
| acid | laurate | <1 | <1 | <1 | <1 | <1 |
| | myristate | <1 | 10-80 | <1 | <1 | <1 |
| | palmitate | <1 | 10-80 | <1 | <1 | <1 |
| | stearate | <1 | <1 | <1 | 10-80 | <1 |
| | | Formulation 30 | | | | |
| acid | laurate | <1 | <1 | <1 | <1 | <1 |
| | myristate | <1 | 10-80 | 10-80 | <1 | <1 |
| | palmitate | <1 | <1 | <1 | <1 | <1 |
| | stearate | <1 | <1 | <1 | 10-80 | <1 |
| | | Formulation 31 | | | | |
| acid | laurate | <1 | <1 | <1 | <1 | <1 |
| | myristate | <1 | 10-80 | <1 | <1 | <1 |
| | palmitate | <1 | <1 | 10-80 | <1 | <1 |
| | stearate | <1 | <1 | <1 | 10-80 | <1 |
| | | Formulation 32 | | | | |
| acid | laurate | <1 | <1 | <1 | <1 | <1 |
| | myristate | <1 | 10-80 | <1 | 10-80 | <1 |
| | palmitate | <1 | <1 | <1 | <1 | <1 |
| | stearate | <1 | <1 | <1 | 10-80 | <1 |
| | | Formulation 33 | | | | |
| acid | laurate | <1 | <1 | <1 | <1 | <1 |
| | myristate | <1 | 10-80 | <1 | 10-80 | <1 |
| | palmitate | <1 | <1 | <1 | <1 | <1 |
| | stearate | <1 | <1 | <1 | 10-80 | <1 |
| | | Formulation 34 | | | | |
| acid | laurate | <1 | <1 | <1 | <1 | <1 |
| | myristate | <1 | <1 | 10-80 | <1 | <1 |
| | palmitate | <1 | 10-80 | <1 | <1 | <1 |
| | stearate | <1 | <1 | <1 | 10-80 | <1 |
| | | Formulation 35 | | | | |
| acid | laurate | <1 | <1 | <1 | <1 | <1 |
| | myristate | <1 | <1 | <1 | <1 | <1 |
| | palmitate | <1 | 10-80 | 10-80 | <1 | <1 |
| | stearate | <1 | <1 | <1 | 10-80 | <1 |
| | | Formulation 36 | | | | |
| acid | laurate | <1 | <1 | <1 | <1 | <1 |
| | myristate | <1 | <1 | <1 | 10-80 | <1 |
| | palmitate | <1 | 10-80 | <1 | <1 | <1 |
| | stearate | <1 | <1 | <1 | 10-80 | <1 |
| | | Formulation 37 | | | | |
| acid | laurate | <1 | <1 | <1 | <1 | <1 |
| | myristate | <1 | <1 | <1 | <1 | <1 |
| | palmitate | <1 | 10-80 | <1 | 10-80 | <1 |
| | stearate | <1 | <1 | <1 | 10-80 | <1 |
| | | Formulation 38 | | | | |
| acid | laurate | <1 | <1 | <1 | <1 | <1 |
| | myristate | <1 | <1 | 10-80 | <1 | <1 |
| | palmitate | <1 | <1 | 10-80 | <1 | <1 |
| | stearate | <1 | <1 | <1 | 10-80 | <1 |
| | | Formulation 39 | | | | |
| acid | laurate | <1 | <1 | <1 | <1 | <1 |
| | myristate | <1 | <1 | 10-80 | 10-80 | <1 |

TABLE 8-continued

| | | alcohol | | | | |
|---|---|---|---|---|---|---|
| | | lauryl | myristyl | palmityl | stearyl | arachidyl |
| | palmitate | <1 | <1 | <1 | <1 | <1 |
| | stearate | <1 | <1 | <1 | 10-80 | <1 |
| | | Formulation 40 | | | | |
| acid | laurate | <1 | <1 | <1 | <1 | <1 |
| | myristate | <1 | <1 | 10-80 | <1 | <1 |
| | palmitate | <1 | <1 | <1 | 10-80 | <1 |
| | stearate | <1 | <1 | <1 | 10-80 | <1 |
| | | Formulation 41 | | | | |
| acid | laurate | <1 | <1 | <1 | <1 | <1 |
| | myristate | <1 | <1 | <1 | 10-80 | <1 |
| | palmitate | <1 | <1 | 10-80 | <1 | <1 |
| | stearate | <1 | <1 | <1 | 10-80 | <1 |
| | | Formulation 42 | | | | |
| acid | laurate | <1 | <1 | <1 | <1 | <1 |
| | myristate | <1 | <1 | <1 | <1 | <1 |
| | palmitate | <1 | <1 | 10-80 | 10-80 | <1 |
| | stearate | <1 | <1 | <1 | 10-80 | <1 |
| | | Formulation 43 | | | | |
| acid | laurate | <1 | <1 | <1 | <1 | <1 |
| | myristate | <1 | <1 | <1 | 10-80 | <1 |
| | palmitate | <1 | <1 | <1 | 10-80 | <1 |
| | stearate | <1 | <1 | <1 | 10-80 | <1 |
| | | Formulation 44 | | | | |
| acid | laurate | <1 | <1 | <1 | <1 | <1 |
| | myristate | <1 | 10-80 | 10-80 | <1 | <1 |
| | palmitate | <1 | <1 | <1 | <1 | <1 |
| | stearate | <1 | <1 | <1 | <1 | <1 |
| | | Formulation 45 | | | | |
| acid | laurate | <1 | <1 | <1 | <1 | <1 |
| | myristate | <1 | 10-80 | <1 | <1 | <1 |
| | palmitate | <1 | 10-80 | 10-80 | <1 | <1 |
| | stearate | <1 | <1 | <1 | <1 | <1 |
| | | Formulation 46 | | | | |
| acid | laurate | <1 | <1 | <1 | <1 | <1 |
| | myristate | <1 | 10-80 | <1 | 10-80 | <1 |
| | palmitate | <1 | 10-80 | <1 | <1 | <1 |
| | stearate | <1 | <1 | <1 | <1 | <1 |
| | | Formulation 47 | | | | |
| acid | laurate | <1 | <1 | <1 | <1 | <1 |
| | myristate | <1 | 10-80 | <1 | <1 | <1 |
| | palmitate | <1 | 10-80 | <1 | 10-80 | <1 |
| | stearate | <1 | <1 | <1 | <1 | <1 |
| | | Formulation 48 | | | | |
| acid | laurate | <1 | <1 | <1 | <1 | <1 |
| | myristate | <1 | 10-80 | 10-80 | <1 | <1 |
| | palmitate | <1 | <1 | 10-80 | <1 | <1 |
| | stearate | <1 | <1 | <1 | <1 | <1 |
| | | Formulation 49 | | | | |
| acid | laurate | <1 | <1 | <1 | <1 | <1 |
| | myristate | <1 | 10-80 | 10-80 | 10-80 | <1 |
| | palmitate | <1 | <1 | <1 | <1 | <1 |
| | stearate | <1 | <1 | <1 | <1 | <1 |
| | | Formulation 50 | | | | |
| acid | laurate | <1 | <1 | <1 | <1 | <1 |
| | myristate | <1 | 10-80 | 10-80 | <1 | <1 |
| | palmitate | <1 | <1 | <1 | 10-80 | <1 |
| | stearate | <1 | <1 | <1 | <1 | <1 |
| | | Formulation 51 | | | | |
| acid | laurate | <1 | <1 | <1 | <1 | <1 |
| | myristate | <1 | 10-80 | <1 | 10-80 | <1 |

TABLE 8-continued

| | | alcohol | | | | |
|---|---|---|---|---|---|---|
| | | lauryl | myristyl | palmityl | stearyl | arachidyl |
| | palmitate | <1 | <1 | 10-80 | <1 | <1 |
| | stearate | <1 | <1 | <1 | <1 | <1 |
| Formulation 52 | | | | | | |
| acid | laurate | <1 | <1 | <1 | <1 | <1 |
| | myristate | <1 | 10-80 | <1 | <1 | <1 |
| | palmitate | <1 | <1 | 10-80 | 10-80 | <1 |
| | stearate | <1 | <1 | <1 | <1 | <1 |
| Formulation 53 | | | | | | |
| acid | laurate | <1 | <1 | <1 | <1 | <1 |
| | myristate | <1 | 10-80 | <1 | 10-80 | <1 |
| | palmitate | <1 | <1 | <1 | 10-80 | <1 |
| | stearate | <1 | <1 | <1 | <1 | <1 |
| Formulation 54 | | | | | | |
| acid | laurate | <1 | <1 | <1 | <1 | <1 |
| | myristate | <1 | <1 | 10-80 | <1 | <1 |
| | palmitate | <1 | 10-80 | 10-80 | <1 | <1 |
| | stearate | <1 | <1 | <1 | <1 | <1 |
| Formulation 55 | | | | | | |
| acid | laurate | <1 | <1 | <1 | <1 | <1 |
| | myristate | <1 | <1 | 10-80 | 10-80 | <1 |
| | palmitate | <1 | 10-80 | <1 | <1 | <1 |
| | stearate | <1 | <1 | <1 | <1 | <1 |
| Formulation 56 | | | | | | |
| acid | laurate | <1 | <1 | <1 | <1 | <1 |
| | myristate | <1 | <1 | 10-80 | <1 | <1 |
| | palmitate | <1 | 10-80 | <1 | 10-80 | <1 |
| | stearate | <1 | <1 | <1 | <1 | <1 |
| Formulation 57 | | | | | | |
| acid | laurate | <1 | <1 | <1 | <1 | <1 |
| | myristate | <1 | <1 | <1 | 10-80 | <1 |
| | palmitate | <1 | 10-80 | 10-80 | <1 | <1 |
| | stearate | <1 | <1 | <1 | <1 | <1 |
| Formulation 58 | | | | | | |
| acid | laurate | <1 | <1 | <1 | <1 | <1 |
| | myristate | <1 | <1 | <1 | <1 | <1 |
| | palmitate | <1 | 10-80 | 10-80 | 10-80 | <1 |
| | stearate | <1 | <1 | <1 | <1 | <1 |
| Formulation 59 | | | | | | |
| acid | laurate | <1 | <1 | <1 | <1 | <1 |
| | myristate | <1 | <1 | <1 | 10-80 | <1 |
| | palmitate | <1 | 10-80 | <1 | 10-80 | <1 |
| | stearate | <1 | <1 | <1 | <1 | <1 |
| Formulation 60 | | | | | | |
| acid | laurate | <1 | <1 | <1 | <1 | <1 |
| | myristate | <1 | <1 | 10-80 | 10-80 | <1 |
| | palmitate | <1 | <1 | 10-80 | <1 | <1 |
| | stearate | <1 | <1 | <1 | <1 | <1 |
| Formulation 61 | | | | | | |
| acid | laurate | <1 | <1 | <1 | <1 | <1 |
| | myristate | <1 | <1 | <1 | <1 | <1 |
| | palmitate | <1 | <1 | 10-80 | 10-80 | <1 |
| | stearate | <1 | <1 | <1 | <1 | <1 |
| Formulation 62 | | | | | | |
| acid | laurate | <1 | <1 | <1 | <1 | <1 |
| | myristate | <1 | <1 | 10-80 | 10-80 | <1 |
| | palmitate | <1 | <1 | <1 | 10-80 | <1 |
| | stearate | <1 | <1 | <1 | <1 | <1 |
| Formulation 63 | | | | | | |
| acid | laurate | <1 | <1 | <1 | <1 | <1 |
| | myristate | <1 | <1 | <1 | 10-80 | <1 |
| | palmitate | <1 | <1 | 10-80 | 10-80 | <1 |
| | stearate | <1 | <1 | <1 | <1 | <1 |

Thus it can be clearly seen that additives conforming to this invention provide the unique combination of a rapid and long-lasting reduction in the coefficient of friction of PET whilst maintaining low colour and high transparency.

Whilst it is known that certain individual esters found in the Formulations 1 to 6 have been reported as anti-slip agents in polymers, this has generally not been reported in polyester-type polymers and in particular not in PET polymers for use in bottle manufacture as defined herein. The activity of certain mixtures of esters including, but in no way limited to, myristyl myristate, cetyl myristate, stearyl myristate, myristyl palmitate, cetyl palmitate, stearyl palmitate, stearyl stearate and cetyl stearate is therefore unexpected and could not have been predicted based on the activities known in the literature. This group of compounds provides slip values in the order of 40% or better at the test concentrations when compared to the blank. Such values are particularly high and represent a significant improvement on currently used additives in this context.

Preparation 1

Materials

85/90% behenic acid, AV=163.7 mg KOH/g, (mwt 342.7 g/mol), 200.0 g (0.584 mole). n-butanol (butan-1-ol) 99.4+% (Aldrich), (mwt 74.12 g/mol), 400.0 g (5.397 mole). sulphuric acid (98% min) catalyst, 4.0 g, or 1% on wt of butanol.

Procedure

A flask equipped with a stirrer and vertical water-cooled reflux condenser, was charged with the materials above and heated to and maintained at 110-120° C. under air at atmospheric pressure with constant reflux of butanol for approximately 4.5 hours. The resulting mixture was transferred to a separating funnel then 1 L of n-heptane @ 60° C. added, followed by 2 L of saturated brine solution. The whole mixture was shaken and the phases allowed to separate. The aqueous phase was run off, and the heptane phase retained. The heptane phase was then repeatedly washed with ca. 1 L of warm (60° C.) distilled water until washings were pH 6. The heptane phase was then dried over anhydrous sodium sulphate and filtered. The filtrate was evaporated to constant weight on a rotary evaporator @ 70° C. under 700 mmHg vacuum. Finally, the headspace of the vessel was blown with nitrogen for ca. 15 minutes to remove traces of butanol smell.

Yield 186 g (theoretical maximum yield=232.9 g) 80% yield.

Analysis of Final Product:

| | |
|---|---|
| AV | 4.6 mg KOH/g |
| OHV | 10.0 mg KOH/g |
| Sap value | 137.3 mg KOH/g |
| moisture | 0.02% wt |
| colour | 156 Hazen |

Preparation 2—Preparation of Esters

The esters detailed in this invention may be prepared by any common method of esterification e.g. the reaction of a carboxylic acid and a simple alcohol in the presence of an acid catalyst. In particular the mixture of esters given in Formulation 1 is prepared by mixing the appropriate stoichiometric ratios of linear saturated fatty alcohols (principally C14-C18) with linear saturated carboxylic acids (principally 14-16) followed by heating and stirring with a suitable acid for several hours. This may be facilitated further by the removal of water formed during the reaction. A similar end product could be produced by other routes such as the reaction of a carboxylic acid with an alkyl halide or the reaction an acid chloride with the alcohol. Further more a product with similar efficacy could also be produced by blending appropriate amounts of the pure esters. The preferred method of producing the ester mixture will depend upon the number of esters present, their relative proportions and the cost of commercially available starting materials. This choice will be made by the appropriate materials expert.

The invention claimed is:

1. A method of lowering the coefficient of friction of a polyester polymer by incorporating a slip agent composition comprising a mixture of at least three aliphatic esters selected from a group consisting of:
   <1 wt. % to 17 wt. % myristyl myristate;
   0.5 wt. % to 38 wt. % myristyl palmitate;
   4 wt. % to 34 wt. % palmityl myristate;
   10 wt. % to 45 wt. % palmityl palmitate;
   <1 wt. % to 4 wt. % palmityl stearate;
   2 wt. % to 14 wt. % stearyl myristate;
   4 wt. % to 53 wt. % stearyl palmitate;
   <1 wt. % to 45 wt. % stearyl stearate;
   <1 wt. % to 3 wt. % stearyl arachidate; and
   <1 wt. % to 45 wt. % stearyl behenate.

2. The method of claim 1, wherein the slip agent composition comprises a mixture of at least three aliphatic esters selected from said group.

3. The method of claim 1, wherein each ester component of the slip agent composition is present in an amount of 0.5 wt. % to 95 wt. % of said composition.

4. The method of claim 1, wherein the slip agent composition comprises a mixture of at least three aliphatic esters selected from a group consisting of:
   myristyl myristate;
   myristyl palmitate;
   palmityl myristate;
   palmityl palmitate;
   stearyl myristate; and
   stearyl palmitate.

5. The method of claim 1, wherein the slip agent composition comprises a mixture of:
   myristyl palmitate;
   palmityl palmitate;
   stearyl myristate; and
   stearyl palmitate.

6. The method of claim 1, wherein the slip agent composition comprises a mixture of:
   myristyl palmitate;
   palmityl myristate;
   palmityl palmitate; and
   stearyl palmitate.

7. The method of claim 1, wherein the slip agent composition comprises a mixture of:
   myristyl palmitate;
   palmityl myristate;
   palmityl palmitate;
   stearyl myristate; and
   stearyl palmitate.

8. The method of claim 1, wherein the polyester polymer is selected from a group comprising: poly(butylene terephthalate); poly(cyclohexanedimethylene terephthalate); poly(ethylene isophthalate); poly(ethylene phthalate); poly(ethylene 2,6-naphthalenedicarboxylate); poly(ethylene terephthalate); PETG (glycolised polyester); polycarbonates; polylactic acid (PLA); and co-polymers thereof.

9. The method of claim 1, wherein the slip agent composition is present in said polyester polymer in an amount of between 0.1% to 1.0% wt/wt.

10. The method of claim 1, wherein the slip agent composition is present in said polyester polymer in an amount of between 0.2% to 0.75% wt/wt.

11. A polyester polymer, comprising a slip agent composition comprising a mixture of at least three aliphatic esters selected from a group consisting of:
   <1 wt. % to 17 wt. % myristyl myristate;
   0.5 wt. % to 38 wt. % myristyl palmitate;
   4 wt. % to 34 wt. % palmityl myristate;
   10 wt. % to 45 wt. % palmityl palmitate;
   <1 wt. % to 4 wt. % palmityl stearate;
   2 wt. % to 14 wt. % stearyl myristate;
   4 wt. % to 53 wt. % stearyl palmitate;
   <1 wt. % to 45 wt. % stearyl stearate;
   <1 wt. % to 3 wt. % stearyl arachidate; and
   <1 wt. % to 45 wt. % stearyl behenate;
wherein the slip agent composition lowers the coefficient of friction of the polyester polymer.

12. The polyester polymer of claim 11, wherein the slip agent composition comprises at least three aliphatic esters selected from said group.

13. The polyester polymer of claim 11, wherein each ester component of the slip agent composition is present in an amount of 0.5 wt. % to 95 wt. % of said composition.

14. The polyester polymer of claim 11, wherein the slip agent composition comprises a mixture of at least three aliphatic esters selected from a group consisting of:
   myristyl myristate;
   myristyl palmitate;
   palmityl myristate;
   palmityl palmitate;
   stearyl myristate; and
   stearyl palmitate.

15. The polyester polymer of claim 11, wherein the slip agent composition comprises a mixture of:
   myristyl palmitate;
   palmityl palmitate;
   stearyl myristate; and
   stearyl palmitate.

16. The polyester polymer of claim 11, wherein the slip agent composition comprises a mixture of:
   myristyl palmitate;
   palmityl myristate;
   palmityl palmitate; and
   stearyl palmitate.

17. The polyester polymer of claim 11, wherein the slip agent composition comprises a mixture of:
   myristyl palmitate;
   palmityl myristate;
   palmityl palmitate;
   stearyl myristate; and
   stearyl palmitate.

18. The polyester polymer of claim 11, wherein the polymer is selected from a group comprising: poly(butylene terephthalate); poly(cyclohexanedimethylene terephthalate); poly(ethylene isophthalate); poly(ethylene phthalate); poly(ethylene 2,6-naphthalenedicarboxylate); poly(ethylene terephthalate); PETG (glycolised polyester); polycarbonates; polylactic acid (PLA); and co-polymers thereof.

19. The polyester polymer of claim 11, wherein the slip agent composition is present in said polyester polymer in an amount of between 0.1% to 1.0% wt/wt.

20. The polyester polymer of claim 11, wherein the slip agent composition is present in said polyester polymer in an amount of between 0.2% to 0.75% wt/wt.

21. A method of lowering the coefficient of friction of a polyester polymer by incorporating a slip agent composition comprising a mixture of at least three aliphatic esters selected from a group consisting of:
<1 wt. % to 17 wt. % myristyl myristate;
0.5 wt. % to 38 wt. % myristyl palmitate;
4 wt. % to 34 wt. % palmityl myristate;
10 wt. % to 45 wt. % palmityl palmitate;
2 wt. % to 14 wt. % stearyl myristate; and
4 wt. % to 53 wt. % stearyl palmitate.

22. The method of claim 21, wherein the slip agent composition comprises a mixture of:
myristyl palmitate;
palmityl palmitate;
stearyl myristate; and
stearyl palmitate.

23. The method of claim 21, wherein the slip agent composition comprises a mixture of:
myristyl palmitate;
palmityl myristate;
palmityl palmitate; and
stearyl palmitate.

24. The method of claim 21, wherein the slip agent composition comprises a mixture of:
myristyl palmitate;
palmityl myristate;
palmityl palmitate;
stearyl myristate; and
stearyl palmitate.

25. A polyester polymer, comprising a slip agent composition comprising a mixture of at least three aliphatic esters selected from a group consisting of:
<1 wt. % to 17 wt. % myristyl myristate;
0.5 wt. % to 38 wt. % myristyl palmitate;
4 wt. % to 34 wt. % palmityl myristate;
10 wt. % to 45 wt. % palmityl palmitate;
2 wt. % to 14 wt % stearyl myristate; and
4 wt. % to 53 wt. % stearyl palmitate;
wherein the slip agent composition lowers the coefficient of friction of the polyester polymer.

* * * * *